United States Patent [19]
Waters et al.

[11] Patent Number: 6,006,254
[45] Date of Patent: Dec. 21, 1999

[54] SYSTEM FOR THE RELIABLE, FAST, LOW-LATENCY COMMUNICATION OF OBJECT STATE UPDATES OVER A COMPUTER NETWORK BY COMBINING LOSSY AND LOSSLESS COMMUNICATIONS

[75] Inventors: Richard C. Waters, Concord; David Anderson, Belmont, both of Mass.

[73] Assignee: Mitsubishi Electric Information Technology Center America, Inc., Cambridge, Mass.

[21] Appl. No.: 08/920,585

[22] Filed: Aug. 29, 1997

[51] Int. Cl.$^6$ .............................. G06F 13/00; G06F 15/16
[52] U.S. Cl. ........................... 709/205; 709/204; 709/206
[58] Field of Search .................... 709/205, 232, 709/206, 230, 236, 200, 204

[56] References Cited

U.S. PATENT DOCUMENTS

| | | | |
|---|---|---|---|
| 5,361,256 | 11/1994 | Doeringer et al. | 370/390 |
| 5,457,808 | 10/1995 | Osawa et al. | 455/8 |
| 5,761,433 | 6/1998 | Billings | 709/231 |
| 5,790,772 | 8/1998 | Badovinatz et al. | 709/106 |
| 5,838,909 | 11/1998 | Roy et al. | 709/209 |
| 5,898,679 | 4/1999 | Brederveld et al. | 370/315 |
| 5,899,810 | 5/1999 | Smith | 463/42 |

*Primary Examiner*—Dung C. Dinh
*Assistant Examiner*—Quoc-Khanh Le
*Attorney, Agent, or Firm*—Dirk Brinkman

[57] ABSTRACT

A system for fast, efficient and reliable communication of object state information among a group of processes combines the use of a fast, but lossy and thus unreliable communications channel to the group of processes and a server coupled to the group for providing data which has been lost in the multicasting. In one embodiment, a central server supports reliability and rapid joining while using UDP multicast messaging to achieve rapid interaction and low bandwidth. Differential messages are sent over the lossy channel to compactly describe how to compute the new state of an object from any of several previous states. Such a description can be interpreted even if some number of prior descriptions were not received, greatly reducing the need for explicit, round-trip message repairs while also conserving bandwidth. In one embodiment, the central server communicates with each member of the group over a reliable channel to robustly detect and repair objects affected by lost messages.

15 Claims, 6 Drawing Sheets

DIFFERENTIAL MESSAGES

SINGLE BASED DIFFERENTIAL MESSAGES $M_1 \rightarrow M_2 \rightarrow M_3 \rightarrow M_4 \rightarrow M_5$ $M_2$ BASED ON $M_1$

IF ANY MESSAGE IS LOST, CHAIN IS BROKEN

DUAL-BASED DIFFERENTIAL MESSAGES

IF ANY MESSAGE IS LOST, (E.G. $M_2$ IS MISSING) CHAIN IS NOT BROKEN BECAUSE CAN $M_3$ CAN BE DECODED IN RELATION TO $M_1$

| | DIFFERENTIAL MESSAGES SEQUENCE OF OBJECT STATUS | | | | | |
|---|---|---|---|---|---|---|
| | $T_1$ | $T_2$ | $T_3$ | $T_4$ | $T_5$ | ... |
| F1 | A | A | A | A | A | |
| F2 | B | B | B | B | B | |
| F3 | C | G | G | C | C | |
| F4 | D | D | D | D | D | |
| F5 | E | E | H | H | I | |
| F6 | F | F | F | F | F | |

Fig. 8

FULL STATE DESCRIPTION AT TIME $T_4$

DIFFERENTIAL STATE DESCRIPTION AT TIME $T_4$ RELATIVE TO $T_3$
F3 = C

Fig. 10

DIFFERENTIAL STATE DESCRIPTION AT TIME $T_4$ RELATIVE TO $T_1, T_2,$ OR $T_3$
F3 = C
F5 = H

Fig. 11

SYSTEM FOR THE RELIABLE, FAST, LOW-LATENCY COMMUNICATION OF OBJECT STATE UPDATES OVER A COMPUTER NETWORK BY COMBINING LOSSY AND LOSSLESS COMMUNICATIONS

FIELD OF INVENTION

This invention relates to network systems and more particularly to a system for the fast reliable transfer of data relating to objects from one node of a network to another where respective processes are running.

BACKGROUND OF INVENTION

In the case where a number of users on a network wish to share data such as graphical objects in a virtual reality scene and to be able to communicate changes in those objects to processes running at each of the nodes, there is a need for a fast and reliable updating system so that each user may quickly and reliably know what changes one user wishes to transmit. For instance, assuming there is a group of asynchronous processes interacting via the shared data-object model of distributed shared memory or some similar sharing model where the processes share objects; and further assuming that this group is possibly communicating over a network, possibly geographically separated and possibly participating in a distributed virtual environment, then the goal is to simultaneously achieve: first, rapid interaction to maximize the speed of communication of object changes in order to achieve near real-time interaction; second, low bandwidth to minimize the communication bandwidth used; third, reliability to guarantee that object changes are eventually, if perhaps sometimes slowly, successfully communicated between the processes; and fourth rapid joining to allow a new user to join a communication group and rapidly become up to date on what all the other processes know.

In the following description, assume that the data to be interactively worked on resides in a world model which is used to describe the set of all objects being shared at any given moment.

When considering how to achieve the above goal, it is important to consider the following spectrum of ways that objects can change. A communications solution must work acceptably at all points of this spectrum and should work particularly well at whatever points are most likely in a particular application.

At one extreme, some objects change very frequently, e.g., tens of times a second or more. For many applications, it matters very little to recover a particular lost message describing a change, because it is not liable to be possible to do so before the change is rendered obsolete. Rather, the focus should be on always being able to utilize the latest information as soon as it arrives. In addition, one should use as few resources as possible on useless repair attempts. Using application specific knowledge to determine that some lost messages are not worth repairing, because they have been obsoleted by subsequent changes, is central to the strategy referred to as object-based repair.

At the other extreme, some objects change very infrequently, e.g., only once every few minutes or hours. In this situation, the exact moment a change occurs may or may not matter, but the fact of the change certainly matters. It is very important that each individual change be communicated. It is also important that if information is lost about a particular change, this is detected long before the next change occurs. In this situation, some sort of positive acknowledgment scheme is needed to detect lost messages.

In the middle are objects that change at moderate speed, e.g., once every few seconds or so. Here repair is important and must be relatively timely. This is a particularly difficult part of the spectrum to support well. Fortunately, it is plausible that many applications make use of the two ends of the spectrum more than the middle.

It should be realized that a single object may be changed rapidly for a while and then change slowly or not at all for a while. Therefore, a general purpose approach cannot rely on knowing in advance which objects will exhibit which kind of behavior. Rather it must adjust dynamically to whatever is happening.

As to Distributed Database and Shared Memory Technology, one way to approach the goal above is to use standard distributed database or shared memory technology. In these approaches the paramount goal held up above all others is insuring that at any moment when two processes access a given shared object, the two processes will always obtain the same values. To satisfy this goal, locks must be used to prevent processes from accessing objects at the wrong time.

For example, suppose that process Pi wants to modify object A. To do this P1 must:

1. check that no other process has locked A, waiting if necessary until the lock is free,
2. lock A so that other processes are prevented from accessing A,
3. send messages to all the other processes in the group notifying them that the lock is set,
4. wait until it receives return messages from all other processes acknowledging the lock. Note, this may result in discovering that some other process took the lock first, in which case P1 must return to step 1 above.
5. make the desired change in A,
6. send messages to all other processes specifying the change,
7. wait until it receives return messages from all other processes acknowledging receipt of the change messages,
8. remove the lock on A,
9. send messages to all other processes saying that the lock is removed.

This handshaking wastes bandwidth and dramatically slows interaction. Setting and freeing the lock on A requires multiple messages to be sent between P1 and the other processes in the group. The back and forth communication greatly increases the latency interval between the time P1 decides to change A and the earliest time at which any other process can access the change. Each message must be sent completely reliably which further increases bandwidth usage and latency.

Finally, the latency rises rapidly as the number of processes in a group rises. As a result, standard distributed database or shared memory approaches cannot be used for the near real-time interaction of more than a handful of processes.

To achieve near real-time interaction between even a moderate number of processes, one must abandon the otherwise desirable requirement that when two processes access a given shared object, the two processes will always obtain the same values. Rather, one must dispense with inter-process locking and allow temporary disagreements between processes about the values associated with an object. In particular, when a process P1 modifies an object A, there will be a short period of time before another process P2 finds out about this change and during that time the values obtained by P1 and P2 when they access A will differ.

It is convenient to also assume that each object has an owning process and only that process can modify the object. This avoids writers/writers problems and means that there does not have to be any means of arbitrating between simultaneous changes. If an application wants to have several processes that can alter a given object, then the ownership of the object can be transferred from one process to another. Alternatively, a single process can be appointed as arbiter of change requests for the object and be the process that actually makes the changes based on these requests. This essentially mimics exactly what would have to be happening if multiple processes were to directly modify the object, because there would in that case have to be some arbitration method. For purposes of discussion, what follows assumes that at any given moment each object has only one process that can alter it.

Given a relaxed equality constraint, several approaches have been used to attempt to meet the goal above: central server systems, Distributed Interactive Simulation, DIS, and reliable multicast.

Central server approaches have each process in a group communicate the changes it makes to a central server, which then notifies the other processes. This approach does a good job of keeping the information known by the processes as close to the same as possible.

It also does a good job of allowing rapid joining, because a new process can receive a rapid download from the central server of everything it is supposed to know. In addition, by sending the messages to and from the server using a reliable protocol such as TCP, the central server approach can easily guarantee reliable delivery of information.

However, the central server approach has two problems. First, interaction speed is significantly limited, because all messages have to go first to the central server and then to the other processes in the group. In comparison to sending messages directly from one process to another, this adds an additional message flight time and adds the time required for the server to interpret the incoming message, decide what to do with it, and generate an outgoing message.

Second, bandwidth needs are increased somewhat due to the need to send messages to the central server as well as to the other processes in the group.

Systems conforming to the Distributed Interactive Simulation standard, DIS, Standard for Information Technology, Protocols for Distributed Interactive Simulation, DIS ANSI/IEEE standard 1278-1993, American National Standards Institute, 1993, send messages about object changes directly from one process to another using what is effectively multicast messages using the UDP protocol. Actually, early DIS systems use broadcast in dedicated subnetworks with special bridging hardware/software to forward messages from one subnetwork to another, but this is essentially what multicast capable network routers do.

The key virtue of the DIS approach is that it communicates information between processes at the maximum possible speed. In addition, multicast uses significantly less system bandwidth than multiple point to point connections. However, there is no guarantee of delivery of UDP messages. Therefore, DIS does not guarantee that a change made by one process will ever be known by a given other process.

To counteract the reliability problem, DIS takes two actions. First, each message sent contains full information about an object so that it can always be understood even if previous messages about the object have been lost. Second, DIS systems send out frequent 'keep-alive' messages specifying the current state of each object, typically once every 5 seconds. This means that lost information is typically repaired within 5–10 seconds. It also means that a new process will be informed of everything it needs to know in 5–10 seconds.

The above notwithstanding, DIS is still left with four significant problems. First, the fact that differential messages cannot be used, and therefore each message describes an object fully, wastes a lot of bandwidth, because even when only a small part of an object is changing, a description of the whole object is continually being sent.

Second, the keep-alive messages waste a lot of bandwidth, because when an object is not changing at all, repeated messages are still sent describing the whole object.

Third, while keep-alive messages cause eventual repair, they do not cause fast repair. Therefore, the processes in the group can get significantly out of synchronization in what they believe about the data they share and near real-time interaction is impaired.

Fourth, joining is not rapid, because it takes 5–10 seconds for a new process to learn what the other processes know.

A clever part of DIS is that there is no central server process at all, and no need for any process to figure out what information other processes have received. Rather, all processes just forge ahead in ignorance of the others. When few messages are lost, things work extremely well, albeit at the cost of significant additional bandwidth. When a significant number of messages are lost, things continue to work out with no increase in bandwidth usage, albeit with a reduction in real-time interaction.

A final piece of related prior work is research on reliable multicast protocols. In that work, the primary goal is to achieve low bandwidth operation using multicast messages, but to incorporate handshaking that ensures reliability. There are two basic ways to do this: with acknowledgment messages, ACKs, or negative acknowledgment messages, NAKs.

In ACK-based approaches, each recipient sends explicit ACKs of the receipt of the messages sent to it. As in protocols such as TCP, this allows the sender to know exactly what has to be resent and to whom. However, the problem with this is what is referred to as an "ACK explosion".

Suppose that a process P is sending messages to N other processes. Each time P sends a message, N ACKs are generated. This uses significant bandwidth and causes P to receive N messages that it has to deal with for each message it sends out. Note that in the group as a whole, there are N times as many ACK messages as data carrying messages. As a result, the ACK messages soon come to dominate all communication as the group grows large. If the ACKs are themselves sent by multicast, then all the processes have to deal with all the ACKs. If the ACKs are send directly from the various processes back to the sending processes, then this means that on the order of N-squared 1-to-1 channels are open and the bandwidth needed for communicating ACKs is increased.

In NAK-based approaches, control messages are sent only when messages are lost. Specifically, when a process P2 notices that it has failed to receive a message M from another process P, it sends a NAK requesting that the message be resent. The advantage of this approach is that when messages are received, bandwidth is not wasted sending ACKs. However, there are still significant problems.

First, the primary way for P2 to tell that it has missed M is for it to receive a different message sent by P after M. In comparison to using ACKs, this delays the time at which the loss of M can be detected and therefore repaired. This problem is particularly severe if P does not send any message after M. In that case, P2 might never notice that M was lost. To counteract this problem, some kind of message must be sent that specifies what processes should have received. A pure NAK-based approach is only possible when each process sends a steady stream of messages.

Secondly, as with ACKs, if NAKs are themselves sent by multicast, then all the processes have to receive all the NAKs. If the NAKs are send directly from the various processes back to the sending processes, then this means that on the order of N-squared 1-to-1 channels are open and the bandwidth needed for communicating NAKs is increased. In either case, the N NAKs that converge on the sender when a message is entirely lost is referred to as a "NAK implosion". The existence of this traffic causes difficulty at the sender that can further impede communication beyond whatever problem caused the communication to fail in the first place.

From this perspective, reliable multicast protocols have several key problems. First, most of them do not even attempt to support near real-time interaction or rapid joining, focusing instead on reliability, and low bandwidth.

Second, many of them expend significant resources ensuring reliability features such as order of arrival that are not useful for solving the problem posed above.

Third, if ACKs are used, this uses a significant amount of bandwidth, even when few messages are being lost. If a significant number of messages are being lost, then bandwidth usage goes up further due to the need to resend messages that are lost. If NAKs are used, then bandwidth usage is much lower when things go well, but ramps up much more steeply as messages are lost, due to the need to begin sending many NAKs in addition to resending messages.

In both cases, the basic behavior of requiring more bandwidth when messages are being lost is unfortunate since bandwidth limitations are a prime reason why messages get lost. Particularly in NAK-based approaches, this can cause a negative spiral where the initial onset of problems causes more problems.

Fourth, and perhaps worst, pushing directly for reliability at the low level of multicast messages themselves does not strike at the heart of the problem posed above. For example, suppose that process P1 changes object A at time T1 and sends a message M describing this change. Suppose in a NAK-based approach that at some later time T2, a process P2 discovers that it has not received M. P2 then sends a NAK requesting the retransmission of M. This is all well and good, but what P2 really wants to get is not M, but what the state of A is at T2. That is to say, the reliability that is desired is not necessarily the receipt of every message, but rather getting at all times the most up-to-date information about A possible.

SUMMARY OF THE INVENTION

The basic solution to the problem above is to use a central server to support reliability and rapid joining, while using UDP multicast messaging to achieve rapid interaction and low bandwidth. Differential messages are used to achieve still lower bandwidth, and object-based repair is used to avoid unnecessary repairs.

Specifically, a system for fast, efficient and reliable communication of object state information among a group of processes combine the use of a fast, but lossy and thus unreliable multicast link to a group of processes and a server coupled to the processes for providing data which has been lost in the multicasting. In one embodiment, a central server supports reliability and rapid joining while using UDP multicast messaging to achieve rapid interaction and low bandwidth. Differential messages are used to enable detection of changes and lost data in which differential descriptions are created that describe how to compute the new state of an object from any of several previous states so that a description can be interpreted even if some prior descriptions were not received, thus achieving still lower bandwidth. In one embodiment, messages sent out by the central server to reliably know when information has been lost prevent the need for keep-alive messages.

In one embodiment of the subject system, to reliably know when information has been lost, the server sends messages specifying what should have been received by each process.

Keep-alive messages are avoided because they waste bandwidth without allowing timely repair or truly rapid joining. Because the expected situation features objects that are changed many times with only a small change each time, bandwidth can be greatly reduced by using differential object descriptions that describe only the changes themselves, rather than the full state of objects.

The simplest differential object description specifies how to compute the new state of an object from the previous state. If this kind of description is used, then a process cannot interpret a differential description D unless it has received the prior description. However, one can create differential descriptions that will compute the new state of an object from any of several previous states. If this is the case, then a description D can be interpreted even if the prior description was not received.

Bandwidth can be reduced most if reliability is introduced at a high level where one can take maximum advantage of the constraints of the particular domain, rather than by using brute force at a low level.

In particular, reliability is added to insure that processes end up with the latest state values for each object, not to insure that they actually receive every low-level message. For instance, object state messages that are lost, but soon rendered obsolete by subsequent object state messages do not have to be, and therefore should not be, resent.

To reliably interact in a global shared environment, objects are identified by Globally Unique IDs or GUIDs. To be truly unique in space and time, GUIDs must have many bits, e.g., a hundred or more.

Unfortunately, if nothing is done to counteract it, the use of such GUIDs can use up a lot of bandwidth in messages. In the subject invention, GUIDs are allocated so that there will be many bits in common between the GUIDs used in a given message. Therefore, the GUIDs can be represented in a compact compressed form.

In one embodiment, a compact differential message describes the current state of an object as an update from any of several previous states. This reduces the latency in a system where messages can be lost or arrive out of order. This allows the messages to be interpreted and applied to as soon as they arrive, rather than having to wait for out of order messages to arrive, or for lost messages to be repaired or resent. This also allows robust behavior when messages are lost, without even having to repair the lost messages because one can do repair on an object basis, rather than at the message level.

Note that there is no point in using this technique over a reliable communication channel where the messages are delivered in order. In such a situation, ordinary deltas are sufficient. On the other, the subject system introduces some redundancy that is valuable when messages may be lost or delivered out of order.

In the subject system a technique is used for efficiently computing what changed, by OR-ing together bitmasks or the words that changed in each cycle. If one or more fields are being changed repeatedly, a common case, our encoding incurs no extra cost for reaching back over many previous states, compared to the cost of describing the delta to the immediately previous state.

In these uses of differential messages in ISTP, they are arranged for a lot of redundancy among the GUIDs in the same message in order to increase compressibility.

The following describes the overall approach to region-based communication which is the basis for the subject system. In a networked computer system with one or more nodes updating information about objects they control, and one or more nodes needing to receive those updates, the subject system reliably communicates those updates in a way that delivers them more quickly and with less bandwidth than previous techniques.

As to keypoints, multicast, group-based, communication between peers, with a server listening to that communication. This central server is the focus of reliability, with multicast being used for low-latency, low-bandwidth interaction.

Object-based reliability, as opposed to message-level repair, avoids useless repairs. When repair is needed, if more up-to-date information than that which was lost is now available, we are able to provide that instead.

In the subject system the amount of information that participants must remember about objects that have been removed is bounded by automatically rejecting all overly late messages and using object-based repair to recover any lost information.

Entry into a session is made as rapid as possible by combining an immediate download of all current session state with having the new client join the multicast group where the ongoing updates are being sent. This download includes information about all recently-removed objects, so the new client would not be deceived by later-arriving multicast updates about those objects.

The server is responsible for selecting the multicast address or addresses used by the group, and can use channel hopping to avoid interference or to evict badly behaved participants. This is an extension of the mechanism by which cordless phones select channels to avoid interference.

BRIEF DESCRIPTION OF THE DRAWINGS

These and other features of the subject invention will be better understood taken in conjunction with the Detailed Description, in conjunction with the Drawings, of which:

FIG. 4 is a diagrammatic representation of the subject invention, showing the use of multicast to share object update information among a group of peers, with a server listening in;

FIG. 8 is a table showing a sequence of changes in an object over time in which fields of the object change at each time step;

FIG. 9 is a listing of the full state description of the object of FIG. 8 at T4, illustrating the fields existent at time T4;

FIG. 10 is a listing indicating the state of the object of FIG. 8 at time T4 with respect to the immediately previous state, at time T3, indicating the change; and, FIG. 11 is a listing indicating the state of the object of FIG. 8 at time T4 with respect to either of the three previous states, at times T1, T2 and T3, indicating changes in the field F3 and the field F5.

DETAILED DESCRIPTION

Figure 1:
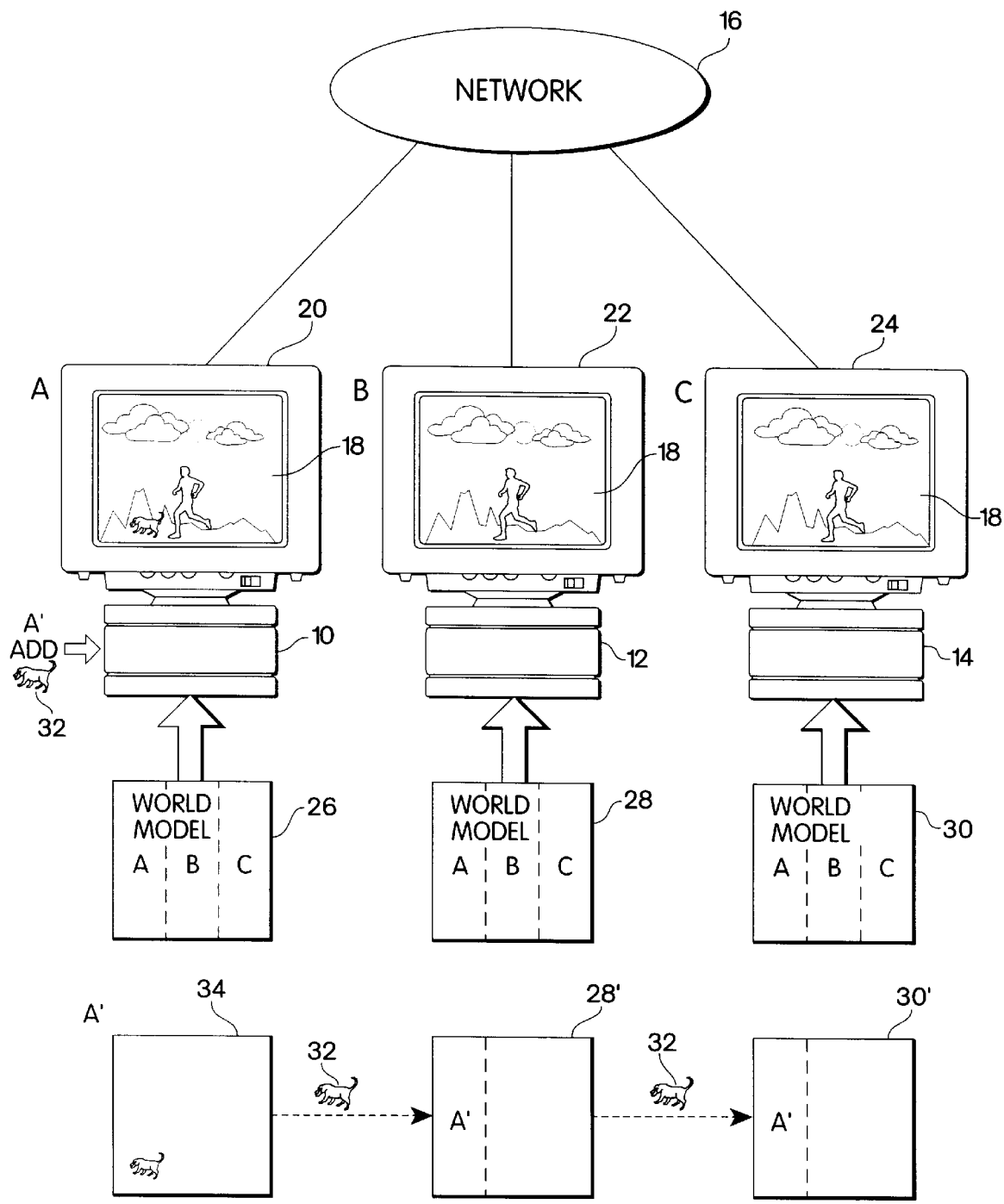
FIG. 1 is a diagrammatic representation of a new object being added to a shared virtual world by one of the participating nodes.

Referring now to FIG. 1, a networked series of processes are running on a series of computers 10, 12, and 14 coupled to network 16, in which in one embodiment, the process includes virtual reality scene 18, displayed on monitors 20, 22 and 24. Users A, B and C at respective computers 10, 12 and 14 are participating in creating the virtual reality scene in which each user, and thus each computer, has an associated world model 26, 28 and 30, each divided up into portions for which each user is responsible.

As can be seen, each world model is thus divided up into sections A, B and C, with user A seeking to modify the virtual reality scene through the addition of a graphical element, in this case dog 32. The change, 34, is to be transmitted to the world model of each of the users as indicated at 28' and 30'.

While it will be appreciated that this embodiment will be described in terms of a multi-user creation of a virtual reality scene, any transmission amongst a number of users of data which is to be modified or changed desirably requires reliable, low-latency, low-bandwidth transmission.

In the past, attempts have been made for such transmission by either transmitting the data and/or the changes to a server for re-transmission to all users. This is referred to as a central server system, and will be described in connection with FIG. 2.

The second common method of transmission of this data and/or its changes is through the utilization of broadcast or multicast networking in which the data or changes are directly communicated to each user. The aforementioned Distributed Interactive Simulation Standard, DIS, is a protocol that uses this approach, which is described in connection with FIG. 3.

Figure 2:
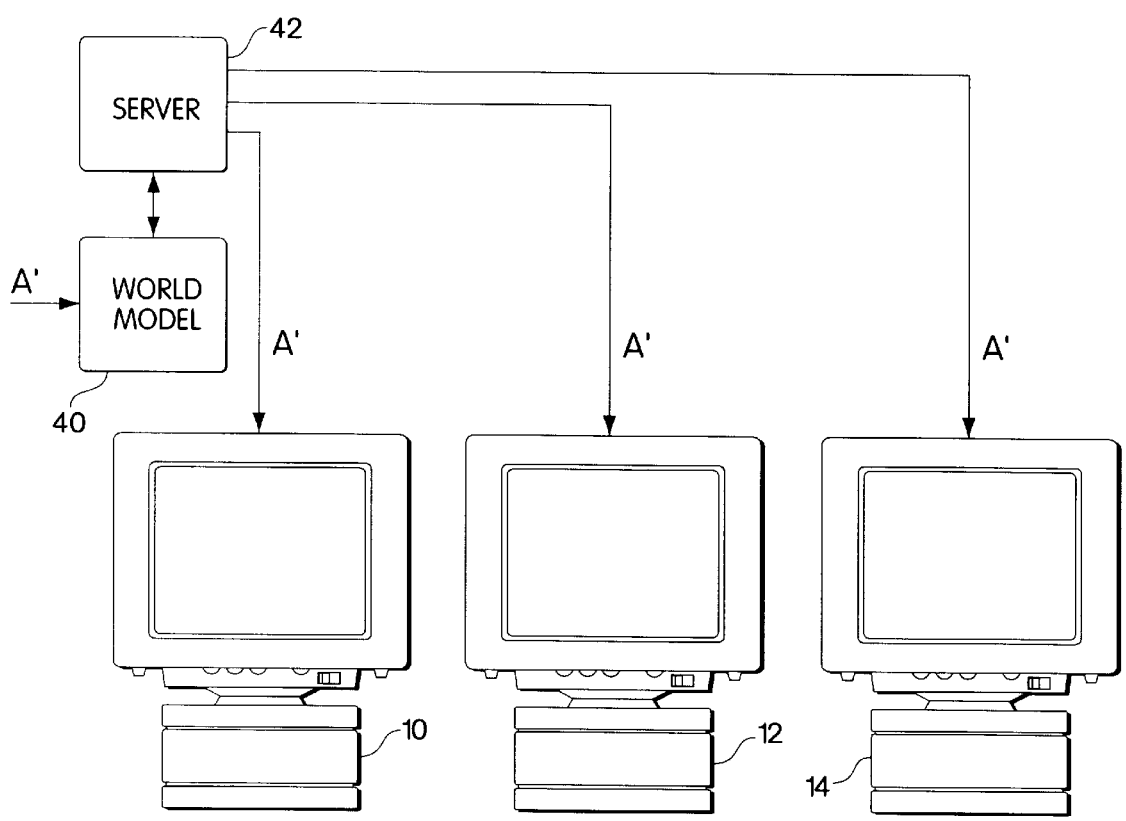
FIG. 2 is a diagrammatic representation of the central server approach to implementing a shared world model.

Referring now to FIG. 2, the change to the world model 40 specified by a user is transmitted to a server 42, which simply transmits the changed data or change to the various users on the network. As mentioned, hereinbefore, the major problems with such an approach are the increased time needed to send the change through the server on its way to each user, and the bottleneck the server places on scaling such a system to a large number of users.

Figure 3:
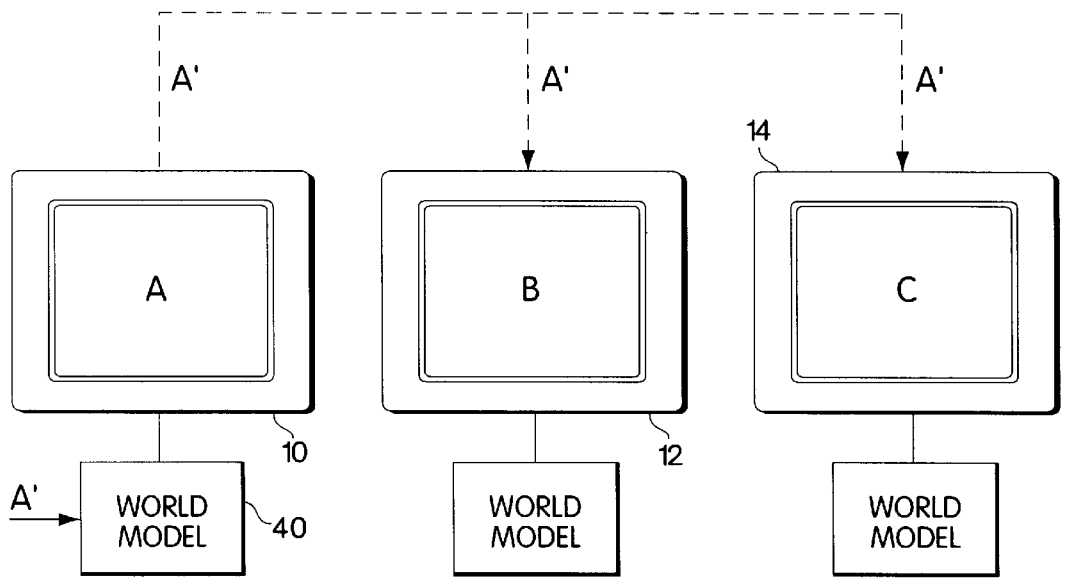
FIG. 3 is a diagrammatic representation of using peer-to-peer messaging, or multicast, to implement a fully distributed world model, in the style of DIS.

Referring now to FIG. 3, the change to the world model 40 is communicated directly to each of the computers 10, 12 and 14 in a peer-to-peer approach in which all processes subscribing to the appropriate address receive the new data. Note heretofore multicast systems of the type described in FIG. 3 have relied on transmitting whole objects, rather than differential messages indicating changes to the data.

Figure 4:
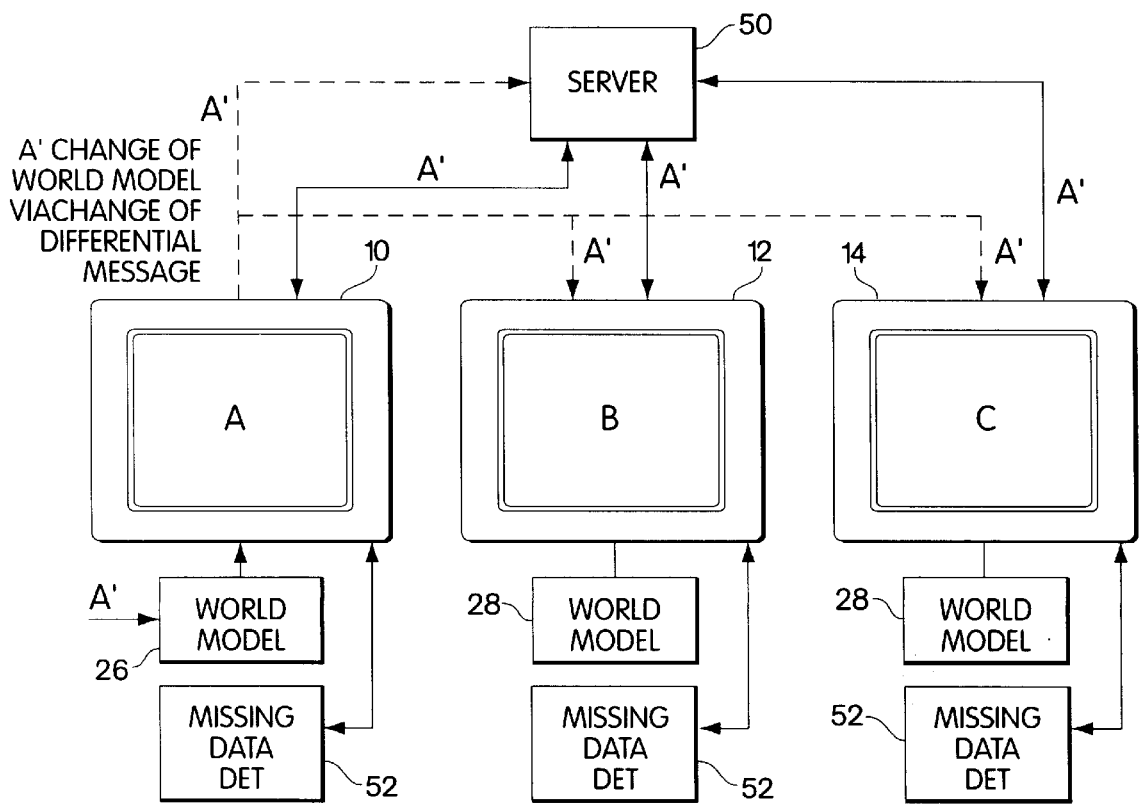

Referring now to FIG. 4, in the subject system, assuming user A wishes to change his world model 26, this change is transmitted simultaneously to server 50 and directly to computers 12 and 14. This transmission may take the form of any conventional broadcast or multicast protocol. What is transmitted is the changed data which user A wishes users B and C to have. As mentioned above, multicasting in general can result in lost or out-of-order data, although the transmission is relatively timely.

A missing data detector 52 is coupled to each of the computers 10, 12 and 14 to perform two functions. The first function is to detect the cases when data from a user has not been received by the server. The second function is to detect when the data stored at a given computer does not contain a change specified by another user.

Figure 5:
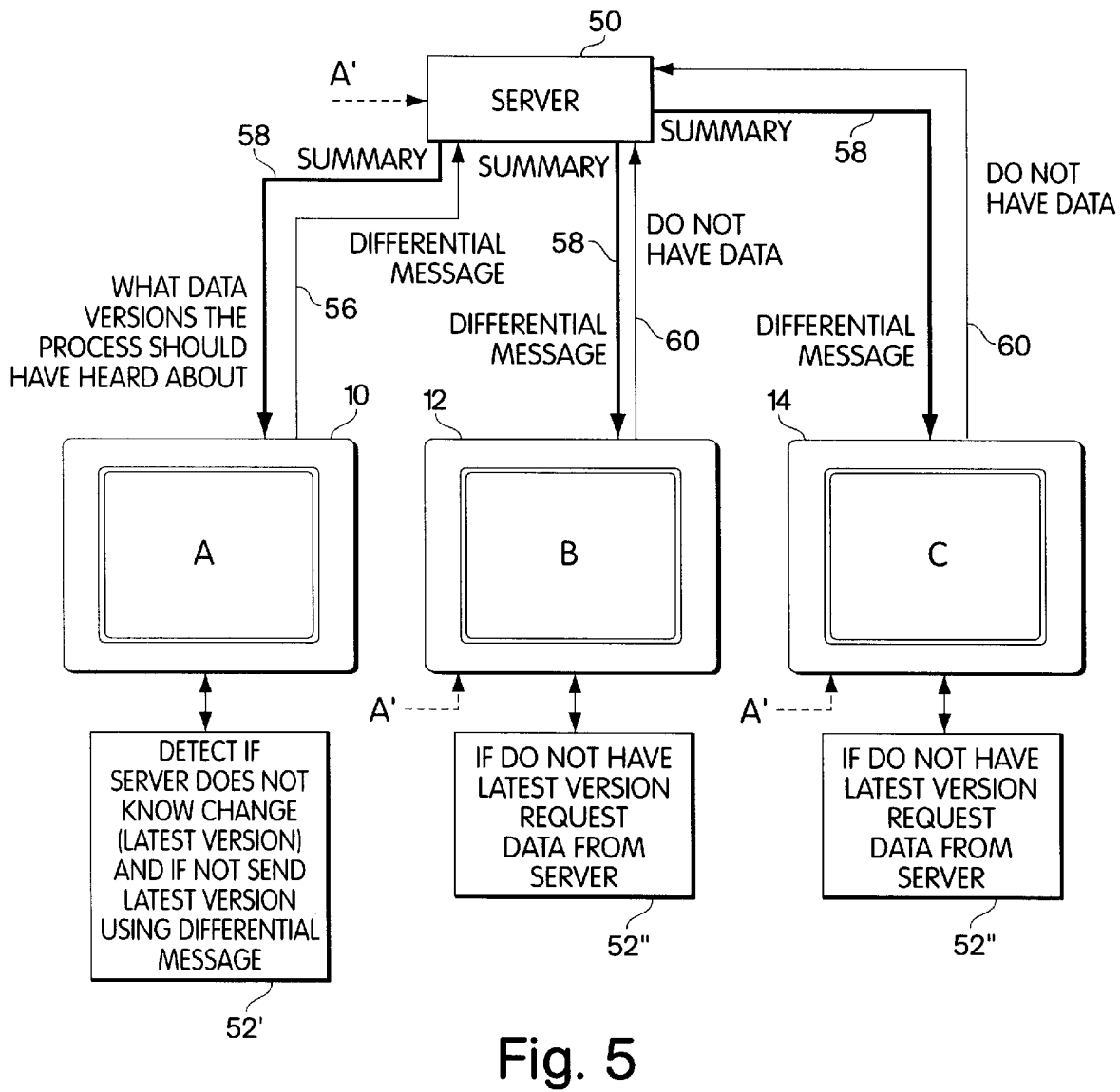
FIG. 5 is a diagrammatic representation of the subject invention, showing how the server interoperates with each client node to ensure overall system reliability at the object level.

Referring now to FIG. 5, two functions of the missing data detector 52 are now described. Object state summary messages 58 are sent from the server 50 to each computer that describe the set of object state updates the server has processed since it last sent such an object state summary. In this case, user A has specified a change in the data A'. Once it receives the change, the server will include this change in its next object state summary message. If this expected portion of the object state summary is absent, the missing data detector 52' can determine the update was lost. In one embodiment, this is then repaired by sending a differential message directly to the server, as indicated at 56.

As to users B and C, if the direct message sent to them from user A is lost, then the summary 58 from the server 50 will inform them of the existence of the lost data. Having determined that the version of the data described in the lost message is not resident at computer 12 or 14, a request 60 is made to server 50 to supply the latest data pertaining to the object whose update was lost.

As a result, the subject system provides reliable and timely data change transmission to a number of networked users by first broadcasting the changes directly to each user, and then permitting repair of lost messages through the utilization of a central server which has been provided with the change.

It will be appreciated that, in general, objects have a number of fields which comprise their state, and in a typical case only one or a small number of fields will change at a given time. However, due to the difficulties just mentioned, the DIS protocol referred to in conjunction with FIG. 3 always sends complete object state, regardless of the nature of the change. This has the virtue of simplicity, but for many applications it is clearly desirable to be able to encode object changes in a manner that both conserves bandwidth and speeds up processing of changes by being able to process out-of-order messages as they arrive. FIGS. 4 and 5 summarizes how one utilizes a central server to ensure that the subject system operates reliably; FIGS. 6 through 11 will illustrate the details of the scheme for encoding object updates.

Further benefits are derived from coupling this network architecture shown in FIG. 5 with differential messages and object based repair. It will be appreciated that changes to data may be transmitted in terms of a message describing which fields of the object have been changed. However, an improvement to standard object deltas can be achieved through the utilization of a multi-based differential messaging technique in which sufficient redundant information is included in each message as to permit reconstruction of complete object state even when some number of intervening updates have been lost.

Figures 6, 7:
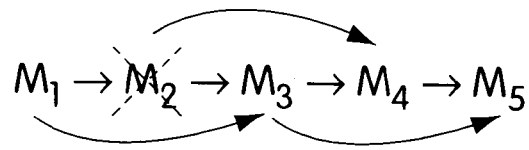
FIG. 6 is a diagrammatic representation illustrating a sequence of differential messages in which a message depends on the immediately preceding message to form a conventional encoding of the change in object state.
FIG. 7 is a diagrammatic representation of the subject system in which differential messages are based on more than one proceeding message to permit reconstruction of data in the event of lost or late prior messages.

Referring now to FIG. 6, in the prior art, assuming an object had one or more fields of an object change at each stage and that each message describes only the change in state from the previous stage, then the loss of a single message M2 makes it impossible to reconstruct the entire object's state. This simplest case of differential messaging is referred to as single-based differential messages. Note that when single-based differential messages arrive out of order, the opportunity to process early arrivals as they arrive is lost because each message can not be processed until all prior messages have been processed. Single-based differential messages are only useful in the context of a reliable network protocol, such as TCP.

Referring now to FIG. 7, dual-based differential messages are illustrated in which the loss of a single message does not cause any trouble. For example, if M2 is lost or late, M3 can still be processed because it describes the object's state at that stage in relation to both the state at M1 and the state at M2.

Referring now to FIG. 8, one can see an object with six fields, F1 through F6, that is going through a sequence of changes at times T1 through T5. In this table, one can see the complete state of the object at each time step.

Referring now to FIG. 9, this is a complete description of the object of FIG. 8, at time T4. The value of each field is specified.

Referring now to FIG. 10, the single-based differential description of the object of FIG. 8 at time T4 relative to time T3 is shown. In this case, the new state is the previous state with the field F3 set to the value C.

Referring now to FIG. 11, a differential state description of the object of FIG. 8 is shown that describes the state at time T4 relative to any of the previous times T1, T2, or T3. Any computer that received messages describing any of those previous three states can properly decode this description. Such recipients of this description are thereby instructed that starting from whatever previous states is present locally, the new state is reached by setting field F3 to C and setting field F5 to H. It will be appreciated that this differential state description is much more compact that the full state description of FIG. 9 and much more useful for transmission over unreliable networks than the single-based differential description of FIG. 10.

In one embodiment and more particularly the participants are a server S and n communicating processes P1 . . . Pn. Note, the messaging protocol used by the subject system is referred to herein as the Interactive Sharing Transfer Protocol, ISTP. Each process Pj owns a number of objects and sends out descriptions of the objects whenever Pj makes changes in them.

Each process receives messages from the other processes about the objects those processes own.

Each process Pj has a 1-to-1 TCP connection to the server S. This is used for the reliable communication of control information. In addition, the processes Pj in a multicast communication group participate in a multicast communication using an address chosen by S.

There are several key parts of the solution: How information about object state is communicated; How multicast messages are sent out and received; How processes are informed of what they should know; How message loss repairs are made; How processes join a communicating group; How processes leave a communicating group.

Each of these parts is described separately below. As part of this three kinds of messages are used.

1. Object State—describes the state of objects
2. Object State Summary—specifies what processes should know
3. Locale Entry—sets things up when a new process joins a group.

a. How Information About Object State Is Communicated

The state of one or more objects is communicated in an object State message, which has the following format.

Object State message fields:

MessageTypeID: 16 bits—value 1 indicates this is an Object State message.

SenderID: 32 bits—compressed GUID identifying sender's spCom.

SendTime: 32 bits—time message sent in milliseconds modulo one week.

NumberOfGUIDPrefixes: 16 bits—number of prefixes G in GUIDTable.

NumberOfDescriptions: 16 bits—number of descriptions D in body of message.

GUIDTable: G GUID prefix entries-96 bits each

TableEntryIndex: 16-bits—used in compressed GUIDs.

GUIDPrefix: 80-bits—prefix potentially shared by many GUIDs in message.

Descriptions: D object descriptions-varying length

Every ISTP message begins with a 16 bit message type that specifies which kind of ISTP message a given message is. Ample bits are provided so that additional types can be used to support extended versions of the ISTP protocol.

The SenderID is the GUID, see below, of the spCom object, see below, identifying the sender of the message. Note that all ISTP messages have the property that they can be fully interpreted without having to know what communication connection they were received on.

The SendTime is the local time in milliseconds modulo one week, 604,800,000 msecs that the message was sent. The NumberOfGUIDPrefixes specifies the number of entries in the GUIDTable.

The NumberOfDescriptions specifies the number of objects described.

The GUIDTable contains entries that allow for the compact representation of GUIDs, including the SenderID, in the rest of the message.

The Descriptions describe the current state of objects using either absolute or relative descriptions, see below.

To understand object descriptions, one must first understand the following facts about objects in ISTP. It is expected that applications will use many kinds of objects. In particular, they are allowed to define new kinds of objects. However, only a very few types of objects matter to ISTP. Two of the most important are sp objects and spClass objects.

b. GUIDs

Every object in ISTP is identified by a Globally Unique Identifier or GUID. ISTP uses 96-bit, or 12-byte, 3-word GUIDs that are unique in time and space. These will expand to 192 bits under IPv6. The GUIDs are composed of two parts:

PROCESS ID: 80 bits corresponding to an ISTP process. This will expand to 176 bits under IPv6. This value is assigned whenever a new process starts and is guaranteed to be unique in space and time, e.g. for a century. This value is opaque. No way is specified for obtaining any information about a process if one only has a process identifier.

The process identifier 0, zero, is reserved for indicating built in objects—i.e., built-in classes.

OBJECT ID: 16 bits. As an ISTP process creates new objects, it generates names for them by changing the object ID part of the name, holding the process identifier constant. Names are never reused. Once $2^{16}$ names have been generated, the process ID is changed.

ISTP does not specify how the Process ID part of a GUID should be generated. However, one plausible way is to compose 80 bit process Ids using internet addresses as follows. This will expand to 176 bits under IPv6.

INTERNET ADDRESS—of the machine a ISTP process is running on. Currently this is 32 bits. It will expand to 128 bits under IPv6.

PORT NUMBER—16 bits. Whenever an ISTP process starts up, it attaches itself to a port. This port is used to differentiate between multiple processes on a machine.

GENERATION COUNTER—32 bits guaranteed to be different every time an ISTP process starts on a given machine. As an initial approximation, one might use time in seconds for this. However, down the road, something that also involves file system interaction and/or communication with a trusted server should be used, because clocks can stop and be set backward.

Note that because the generation counter is a time in seconds, it can be incremented once per second without risking accidental name collision when a process restarts. This allows a processes to use $2^{16}$ object names per second.

To promote memory and communication efficiency, GUIDs are represented at all times in the following compressed form.

PROCESS ID TABLE POINTER: 16 bits that indicates an entry in a table of process ids. The process id table pointer 0, zero, is reserved for indicating built-in objects.

OBJECT ID: The 16-bit object ID for the object.

A table of process ids is used to interpret the process-id-table-pointers in compressed object names. In a world model copy, the process-id-table-pointers are indexes into this table. In a message, the part of the whole table that is needed in order to understand the compressed object names in the message is sparsely represented as a vector of process-id-table-pointer/process-id pairs.

Note that in an Object State message containing several object messages, there is only one unified vector of process-id-table-pointer/process-id pairs.

The GUIDs above are designed so that it is possible to use one indefinitely without having to worry about name collisions. However, it is pragmatically important not to do so. A key benefit of the way GUIDs are used in ISTP is that even though they are in principal very large, the actual communication bandwidth needed is not large. The benefit depends critically on the assumption that almost all the names owned by a given process have the same process id.

If, in the extreme, every object had a different process id, then bandwidth usage would be much larger than it need be. If names were used permanently, then as the days wore on, the ratio of process ids to names in use would relentlessly rise toward 1.0 with unfortunate consequences. Rather than let this happen, one should take the opportunity to remove old objects and create new ones with new names from currently active name spaces whenever possible.

c. Fields of Shared Objects

Every shared object is an instance of a subclass of the class sp. The class sp specifies that every shared object includes the following fields, which are the foundation of object descriptions. All shared objects have the following fields that are shared between processes:

Counter: 16 bits—Incremented whenever the object changes.

DescriptionLength: 16 bits—The total size of the shared data in bytes.

Name: 32 bits—The compressed GUID for the object.

Class: 32 bits—The compressed GUID for the object's class.

Owner: 32 bits—The compressed GUID identifying the owning process.

SharedBits: 16 bits—representing logical values.

IsRemoved: the low-order bit, bit zero—if 1, this indicates that the object has been removed.

The counter value is used as an identifier for the state of an object A. Every time any shared part of A is modified A's counter is incremented.

The DescriptionLength specifies how long a full description of the data in the object has to be. As will become clear below, this is limited to a 13 bit unsigned integer. A 13 bit description length allows objects 4 k bytes long. Since full descriptions are limited to fitting into single UDP packets the length is plenty long enough.

The name of an object is a GUID that is used to uniquely refer to it from fields of other objects and in various ISTP messages.

Each object has many fields in addition to the ones above. The Class is the GUID of a machine manipulable spClass object, see below, that describes what all of the fields of the object are. ISTP can manipulate arbitrary application specific objects with reference to their spClass descriptions.

The owner of an object is a GUID that is used to uniquely refer to the process that owns the object. From the perspective of the discussion here, the only important aspect of this is that it allows every process to determine which objects it does and does not own.

The SharedBits are used to compactly represent various logical values. The only one of these values that is relevant here is the low-order bit, which specifies whether or not an object has been removed.

Counter incrementing and comparison is done using arithmetic modulo $2^{16}$ so that the largest positive counter value rolls over to the smallest. To accommodate this, all comparisons are done using modular arithmetic. That is to say the counter C is less than D, i.e., C<D, if $0<D-C<2^{15}$ or $D-C<-2^{15}$. The counter value zero is reserved to mean a state in which nothing is known about the object A. The counter for an object starts at 1 and skips the value zero as it wraps around when counting up.

A 16 bit state counter allows us to correctly order $2^{15}=32$ k object states. At a rate of 30 state changes per second for an object, this is 16 minutes worth of changes. This is plenty of time considering that ISTP's time horizon for object communication is on the order of seconds.

d. spClass Objects

Object classes are described using spClass objects. Without going into detail here, suffice it to say that an spClass object specifies the position and type of every field in an object. Some classes are built in but most are defined by applications. Two types of fields are worthy of special note.

Fields that refer to other objects contain compressed GUIDs for those objects as discussed above. Fields that contain times represent these times using 32 bit integers whose units are milliseconds modulo one week.

Each receiving process Pk, maintains an estimate DTj of the total time that typically elapses between the time at which a process Pj sends a message M and the time at which Pk processes the message.

This is computed by observing the difference between the SendTime on each received message and the local time on Pk at which the message is processed and computing a moving average, with outlying values ignored. Note that this estimate DTj intentionally conflates estimates of firstly, the time of flight of messages from Pj to Pk; secondly, the average delay at Pk before a message is processed; and thirdly, the absolute difference in the clock settings of Pj and Pk. Because of the last factor, DTj can be negative.

The time estimates DTj are used to adjust times specified in object descriptions from the time frame of Pj to that of Pk as discussed in R. C. Waters, Time Synchronization In Spline, MERL TR 96-09, MERL Cambridge Mass., April 1996.

e. Full Object Descriptions

Full object descriptions can be understood in isolation without reference to any other information about the object. They have the following form: Note that every description starts with 3 bits that specify what kind of description it is.

A full description contains:

DescriptionFormatCode: 3 bits—which for full descriptions is equal to 0.

DescriptionLength: 13 bits—Bytes in description and therefore shared data.

Counter: 15 bits—counter value for object.

Name: 32 bits—compressed GUID that is the name of the object.

Class: 32 bits—compressed GUID for spClass of object.

Data: byte [ ]—Other data fields in object.

Full descriptions are trivial to construct by merely copying all the shared data from the object in question. They are equally trivial to interpret by copying in the reverse direction. The only complexity is dealing with references to other objects via GUIDs and times as discussed above.

f. Differential Object Descriptions

Differential descriptions describe changes in objects from one state to another.

A differential description contains:

DescriptionFormatCode: 3 bits—which for differential descriptions is 1.

BaseCounterDelta: 5 bits—Delta from reference object state.

FirstCode: 8 bits—First byte describing where changes have occurred.

Counter: 16 bits—counter value for object.

Name: 32 bits—compressed GUID that is the name of the object.

OtherCodes: byte [ ]—Remaining bytes indicating positions of changes.

In groups of 4 to preserve alignment.

Data: long [ ]—new word data representing changes.

The BaseCounterDelta specifies what prior states the differential description can be decoded with respect to.

If BaseCounterDelta=0, the description can be interpreted by itself.

If BaseCounterDelta=1, the description cannot be understood unless the prior object state is available.

If BasecounterDelta=N, the description can be interpreted based on any of the last N object states. The penalty for using this approach is that it is harder to encode and that data might have to be included that did not change on the last cycle but rather only on an earlier cycle. However, the gain is that latency is reduced and the message stream is robust against the loss of some descriptions. One place you might use this is when rapidly moving an object around. If the only changes were in X-Y-Z position, then BaseCounterDelta could be quite large without increasing the length of descriptions.

The byte change Codes have the following form. Positive bytes indicate offsets from beginning for the first and after the last change for the rest. Negative bytes, by their absolute values, indicate run lengths. A zero byte signals the end of the change bytes. If there are two non-negative bytes in a row, the length associated with the first offset is one. As a special case, if the very first byte is negative, it is still treated as an offset, the length is one and the set of change codes consists of just this one byte. This special case allows a one-word change to be specified in just 3 words. Each change is specified as an offset relative to the word after the last change. The words of data are aligned in the description and copied into the object as specified by the byte Codes.

For example, <3, −30, 1203> <88088> <A> specifies that state 1203 of object 88088 can be computed from state 1200, 1201, or 1202 by writing the word A at offset 30*4=120. This 12 byte message is an example of the minimal differential description and specifies a 4-byte change.

As a more complex example,

<1, 80; 1203> <88088><−3, 10, 0, 0> <A> <B> <C> <D> specifies that state 1203 of object 880088 can be computed from state 1202 by writing the word A at offset 80*4=320, writing the word B at offset 81*4=324, writing the word C at offset 82*4=328, and writing the word D at offset 93*4=372.

This 28 byte message specifies a 16 byte change. If the first change is more than 127 words into an object, a dummy change has to be used on the way to the real change. Similarly, a change after a one word change can only move 127 words farther down the object. However, given that objects are required to be short enough so that a full description, which we still often have to send, can fit into a single UDP packet, there should be little problem here.

Constructing differential descriptions is harder than computing full descriptions, because one needs to know exactly which words in the object have changed. To compute descriptions where the BaseCounterDelta is 1, one needs to either directly know what words have changed, e.g., recorded in a bit map, where ones indicate changed words, or have a record of the prior state so that comparison can reveal which words have changed. Given either of the above constructing the differential description is straightforward.

To compute descriptions where the BaseCounterDelta is 2, one needs to know which words were altered due to either of the last two state changes. Note that if a word was changed and then changed back to its old value, it still must be included in the description, in case the recipient has the last state rather than the state before last.

A straightforward way to support BaseCounterDeltas of N and less is to save bit maps summarizing the N previous state changes. These can then be OR'ed together to yield a specification of what words to send for any BaseCounterDelta less than or equal to N. If a larger BaseCounterDelta is needed at a given moment, then one can fall back on using a full description. Each time an object is changed a new bit map is computed and saved in a per-object queue, while the oldest bit map, if there are more than N, is discarded.

Having differential messages complicates the handling of GUIDs and times in descriptions, because it is harder to figure out where they are in descriptions. However, the bandwidth savings are well worth the extra complexity.

An important case of differential messages is ones that specify that an object has been removed. In that situation, the only thing that matters is that the IsRemoved bit is set. The values in other fields are irrelevant. As a result, a short differential message can be constructed with a BaseCounterDelta of 0.

It should be noted that we already have a special kind of full description that is differential in nature. Since messages about removed objects call for the destruction of an object, they need not contain the full state. They only need to indicate the bit that specifies that the object is removed. One can therefore send a differential message containing just this information.

g. How Multicast Messages Are Sent Out and Received

On a frequent basis, e.g., once every 30–100, milliseconds, a process Pj sends out one or more Object State messages describing all the objects it has changed since the last time it sent messages. At a similar rate, it processes Object State messages sent by others.

Messages are sent out using UDP multicast packets. Each message is sent in a single packet and each packet contains just one message. The address to use is specified by the server S as discussed below.

An important requirement is that each Object State message must fit in a single UDP packet. That is to say, it must be less than the Maximum Transmission Unit or MTU. What the MTU is depends on the transmission medium. Currently MTU's vary widely from only a couple hundred bytes for modems to 1,500 bytes for Ethernet and beyond. Under IPV6, there will be a minimum MTU of 600 bytes.

At a given moment, if no object has been modified, no message is sent. If several objects have changed, then as many descriptions as possible are packed into each message. Note, Grouping descriptions significantly increases bandwidth usage and improves processing performance at the receivers.

To minimize bandwidth, differential descriptions are used whenever possible. Full descriptions must be used whenever an object is first communicated to the group, i.e., when it is first created. After that differential descriptions are possible. Whenever practical, differential messages are constructed so that they are not relative just to the last state of the object, but all the way back to the initial full message, or failing that, back at least several states.

Having differential descriptions interpretable based on the state before last is clearly a huge advance in being able to tolerate lost messages over going back just one state, which requires the receipt of every message. Going back more than two states has advantages, but clear diminishing returns. Nevertheless, if one small part of an object is being changed rapidly, then one may be able to have differential descriptions interpretable across many states with no added costs.

Since UDP is not a reliable protocol, a given message M sent by Pj may arrive at Pk: never, multiple times, and/or out of order with respect to other messages sent by Pj. Pk must be able to deal with all these situations. This is done primarily on a per-object description basis, rather than on a per-message basis, but one key thing is done with messages as a whole.

A receiving process Pk keeps track of the send and receipt times of the messages it receives from each other process Pj. If Pk receives a message M from Pj that has an earlier SendTime than some other message it has already received from Pj, then M has been received out of order. If two messages have the same SendTime, they have been sent at the same time and their order does not matter to ISTP.

A parameter of ISTP is a maximum delay MaxDelay, typically on the order of several seconds. If a late-arriving message M arrives more than MaxDelay seconds after any previously received message from the same source with a later SendTime, then M is discarded without processing. This imposed limit on the lateness of messages is important for a number of reasons that are discussed below.

As an example, consider the following table:

TABLE I

| message SendTime at Pj | message arrival time at Pk |
|---|---|
| 1 | 11 |
| 2 | 17 |
| 3 | 13 |
| 4 | 17 |
| 5 | 15 |
| 6 | 16 |

The messages sent at 2 and 4 arrive out of order. If MaxDelay=3 then the message sent at 4 can still be used when it arrives. However, the message sent at 2 is discarded because it arrives 4 seconds after the message sent at 3. If MaxDelay=5, both messages could be used.

If MaxDelay=1 both messages would have to be rejected. Since times in messages are represented modulo one week, being able to detect the above rests on the assumption that no message will ever arrive more than 3.5 days late. This is a very safe assumption given that lateness is typically measured in only seconds.

Note that the lateness limit MaxDelay, limits the size of the table needed to record historic information about incoming messages. In particular, there never needs to be more than one message in this table that was received more than MaxDelay seconds ago.

If a message N was received more than MaxDelay seconds ago, then it will force any message sent before N to be discarded on arrival. If there is some other message N' sent later than N that was also received more than MaxDelay seconds ago, then N can be dropped from the table, because any message discarding that is forced by N is also forced by N'. For example, if MaxDelay=3 in the example above, the only information that needs to be retained at time 16 is information about the messages sent at 3, 5, and 6.

If a message is not discarded as being too late, then the object descriptions in it are processed individually as follows.

If a given description D has a counter value less than or equal to the current counter value for the object in Pk, D is ignored. Typically this occurs when D is in a message that has arrived out of order or more than once.

If the counter value in D is greater than the current counter value for the object in Pk, or there is no such object, then the information in D is used as follows. If D is a full description, than it can always be immediately processed to update, or create or remove, the object in question. If a description is differential, then it can be immediately processed as long as it is interpretable relative to the current known state of the object. If not, then there must be some intervening description that has not yet arrived. Descriptions that are not immediately interpretable are saved on per-object queues for later use when missing intervening descriptions arrive.

Once a description has been used, the relevant object description queue is examined to see whether there are any other descriptions that can now be used. One could choose to simply discard differential descriptions that could not be immediately used. This would be simpler, but would reduce the ability of the system to make use of out-of-order messages. If differential descriptions span several states, this might not be a problem.

Because of the differential descriptions that span several states, it is of often possible to act immediately using a description even if the previous description is in a message that was lost or delayed. This limits the damage due to lost and delayed messages without having to detect they are missing or resend them.

One issue that needs special discussion is what happens when a shared object is removed. When an object is being removed, one can use a differential description that can always be interpreted, because the only fact relevant about the object is that it is removed. Once an object has been removed, a potential problem could arise.

Suppose that all trace of a removed object A were removed from process Pk. If so, then a subsequent out-of-order full description of A would appear to be a message specifying the creation of A, and would cause A to erroneously reappear in Pk's memory. To avoid this, a record is maintained about the removal of A for MaxDelay seconds so that such late arriving descriptions can be successfully ignored. If there were no lateness limit MaxDelay, then every object removed would have to be remembered forever by Pk, in order for out-of-order description rejection to be supported.

Note that the multicast Object State messages above are received not only by the other processes in the group, but also by the server S.

Just like the various processes, S uses the messages to maintain a record of the current state of every object.

h. How Processes Are Informed Of What They Should Know

To inform the process Pk of what they should know, the server sends out periodic Object State Summary messages once each MaxDelay seconds.

Object State Summary message fields:
MessageTypeID: 16 bits—value 2 indicates this is an Object State Summary.
SenderID: 32 bits—compressed GUID identifying spCom of receiver.
SendTime: 32 bits—time message sent in milliseconds modulo one week.
NumberOfGUIDPrefixes: 16 bits—number of prefixes G in GUIDTable.
NumberOfNewEntries: 16 bits—number of new object entries N in body.
NumberOfObjectChanges: 16 bits—Number C of object changes.
GUIDTable: G GUID prefix entries-96 bits each
GUIDTableEntryIndex: 16-bits—used in compressed GUIDs.
GUIDPrefix: 80-bits—prefix potentially shared by many GUIDs in message.
NewEntries: N new object summaries-64 bits each
ObjectsTableIndex: 16-bits—specifies table position for object.
CounterValue: 16-bits—CounterValue for object.
CompressedGUID: 32-bits—identifies new object.
ObjectChanges: short [ ]—C object change summaries.

The message type, SenderID, SendTime, NumberOfGUIDPrefixes, and GUIDTable are exactly the same as in an Object State message except that the message type has a different value and the SenderID is the spCom that was used by the process Pk receiving the Object State Summary message when Pk initially contacted the server S. Thus the SenderID only indirectly identifies the sender.

The NumberOfNewEntries specifies how many new table entries are described in the NewEntries part of the message.

The NumberOfObjectChanges specifies how many object changes are described in the ObjectChanges part of the message.

The NewObjects field describes what new objects have appeared since the last Object State Summary message from S. This is discussed in detail below.

The ObjectChanges describe what objects have changed since the last Object State Summary message from S. This is discussed in detail below. Before discussing the payload of an Object State Summary message it is necessary to discuss the objects table maintained in each process Pk. This table lists the compressed GUIDs of each object that exists and its associated current counter value. The table compactly summarizes exactly which objects exist and the counter in the last Object State Summary message sent out about them.

Identical tables are maintained in the server S and each process Pk in a communication group. As discussed in a later section, the objects table for a process Pk is initially constructed as part of finding out what objects exist when Pk joins a communication group. S constructs its master copy of the objects table incrementally by updating it every time it finds out new information about an object.

An Object State Summary message is a differential type of message that specifies changes in the objects table. The summary messages are used to keep the objects tables in each Pk synchronized with the table in S and therefore to tell each Pk whether they have up to date information about all of the objects.

The NewEntries field contains triples of objects table indices, CounterValues and CompressedGUIDs. It specifies that a new entry be created with the indicated data. Entries that have previously been is carded, are reused as much as possible. Dynamic table expansion might be necessary.

It is expected that new objects appearing is a much less frequent event than objects changing. It is possible that an object could appear and the disappear in a single time interval, but this is very rare. In that situation, there would be a new object entry specifying a counter value corresponding to the object having been removed.

If for some reason, a new entry specifies collides with an existing entry, then the new entry information supersedes the existing entry. This can be used by a server to make arbitrary changes in the objects table in a process—e.g., during a reinitialization.

The ObjectChanges field is designed for maximum compactness. It uses a series of byte codes to specify changes in CounterValues for objects. The bytes are decoded as follows.

There are two basic kinds of codes: compact codes and full codes.

Case A: If the high order bit of a code is 0, then the first byte is used to increment the counter associated with the indexed object. The index to use is computed by adding the second unsigned byte to the last table index used. Note, the table index starts at zero.

Case B: If the high order bit of an index code is 1, then the first two bytes are interpreted as a decrement to subtract from the last table index used; and the next two bytes are used as an absolute counter value for the indexed object entry. In order to skip more than 2^15 entries down the table, one has to string together two full entries, the first of which leaves the relevant CounterValue unchanged. In either case A or B above, if the counter part of the code is zero, this indicates that the indexed entry in the objects table should be discarded.

Note that for case B to be useful, we are relying on the fact that typically at least several percent of the objects in a table are changing, so that the entries that have to be changed are reasonably near together. In addition, we are relying on the fact that it is unlikely for a counter to increase by more than 127 between two Object State Summary messages. For 30 changes per second, more than 8 seconds are required to go through 255 changes.

When case B is applicable and there are no new object entries that have to be made, Object State Summary messages have a header of 28 bytes-one GUIDPrefix is required for the SenderID—and can therefore describe N changed objects using just 28+2N bytes.

If 100 objects were changing continually, and Object State Summary messages were sent out once every second, this would cause 1.8 kbps of traffic from S to each process Pj.

As an example of the object changes encoding consider the following <2 8, 0 5, 20 100, −1000 44555>.

This specifies that the 8th table entry should have its counter incremented by 2, the 13th table entry should be discarded, the 113th table entry should have its counter incremented by 20, and the 1113th table entry should have its counter set to 4555. Object Summary messages are processed as follows. Pk processes the new object entries, if any. These entries specify the creation of new objects table entries. S picks the positions of these entries so that they reuse free slots when possible, but do not collide with preexisting entries that are still in use. A new entry is created with the specified index, counter, and GUID.

Each object change entry is then processed as follows. If the entry specifies that an object A has changed, then the CounterValue in the local objects table is updated.

Alternatively, if the object change indicates that the entry should be discarded, then it is discarded.

Note, discarded entries are tagged by giving them zero GUID and CounterValues. Note also that discarding a table entry is very different from removing an object. If an object A is removed, this is specified by an object description that specifies that A is removed. Subsequent to this removal, the server will eventually discard the relevant objects table entry, but it should wait a considerable time before doing so. In particular, it should wait long enough that the process Pk has found out that A has been removed.

In particular, it is suggested that S wait a time like 10* MaxDelay after an object is removed before reusing its table entry. This should with high probability ensure that each process Pk knows that the object has been removed, before the table entry is reused. However, if some processes does not get this information, the object will in any event eventually get removed due to the mechanism discussed below for removing objects that have no objects table entry.

Each time a CounterValue in the local objects table is changed, the following checking is performed. If Pk does not own the object A whose CounterValue C has changed, then Pk checks to see whether it has up-to-date information about A. If Pk does not know about A at all, or has a smaller counter value for A, then Pk sends a request to S for updated information as described, in the next section. Note Pk might have a larger value for the counter, because it might have received information from the owner of A that is not yet included in the summary from S.

For Pk to receive an Object State Summary message M with state C for A, the process Pj that owns A must have sent out a message N with state C of A that S received and processed. Pk should have received N and been able to process it before receiving M under the assumption that sending a message from Pj to S and then from S to Pk should always take longer than sending a message directly from Pj to Pk.

If Pk does own the object A whose CounterValue C has changed, then the Object acknowledgment of as a positive acknowledgment of the receipt of information sent by Pk to S. Pk must know a CounterValue greater than or equal to C even if A has been removed.

If Pk has a larger CounterValue, then it might be the case that the latest message sent out about A got lost and therefore did not reach S. Alternatively, it might be the case that the message is proceeding on its way, but just did not get to S before the Object State Summary message was created. Pk has to decide which of these two situations is most likely. It can do this based on its estimate of the flight time of messages between itself and S. Note that on the current internet, this flight time can be quite long. If Pk concludes that a message was lost, then it resends the message as described in the next section. Note that Pk also has to consider whether a message has been lost if it has information about an object it owns that never gets into the objects table at all.

Note that when Pk removes an object A, it must remember this fact however long is necessary to receive an acknowledgment that S knows that A has been removed. This will typically require Pk to remember that A has been removed much longer than it would need if all it were doing was rejecting out of order descriptions. If Pk forgot about A before getting an acknowledge and the message specifying removal somehow failed to get to S, then a subsequent Object State Summary message could force A to erroneously reappear.

A final way the objects table is used concerns objects that are in Pk's world model, but not in the table. Suppose object A exists, but has no table entry. This is a normal occurrence, if A was just created, by Pk or another process, and the existence of A has not yet made it into an Object State Summary message. However, this situation should not last long.

If Pk owns A, then Pk will eventually send information about A to S via TCP and the problem will be resolved.

If Pk does not own A and yet A remains absent from the objects table for a significant period of time, say 10*MaxDelay, then A somehow arose in an erroneous way. Scenarios which can lead to such are situation are complex and include such things as processes crashing during moments when various processes have inconsistent information about what process owns what object. In any event, Pk rectifies the situation by removing A from its world model. If by some reason, A really should be in the world model, then it will eventually get into an Object State Summary and reappear.

The above mechanism is included in ISTP as a last resort way to make sure that all processes eventually agree on what objects exist.

A critical parameter of the above is how often Object State Summary messages are sent. There is a trade-off between quickness of repairs and the bandwidth used.

If the summary interval is made very small, e.g., fractions of a second, then repairs will be made very quickly, but a significant amount of bandwidth will be used sending the summaries and perhaps worse, resources will be expended making repairs that are better off never being made, because they will soon be obsolete.

The bandwidth used for Object State Summaries themselves could be reduced by not sending any summary at all when the server thinks that no objects have changed or been newly added. However, if this is done, then processes have to be prepared to reason from the absence of Object State Summary messages that information they are sending is not reaching S.

If the summary interval is made very large, e.g., many seconds, then repairs will not be timely, but the bandwidth used for both summary messages and repairs is minimized.

The parameter MaxDelay is used to control the summary interval, because it makes sense for both intervals to be the same. From the perspective of remembering information about out of order messages, making MaxDelay larger has very little cost. On the other hand, handling out-of-order messages with lateness greater than the time explicit repairs are made has little if any value. Only experimentation in a particular network and application environment can yield the best value for MaxDelay. However, we expect that all things being equal a value of one to a few seconds is best. Because Object State Summary messages are incremental, they ensure reliability only if they are themselves 100% reliably communicated.

The code doing the TCP transport must take great care to ensure this. If any interruption in TCP communication occurs, this must reported as a break in communication so that a complete restart and reinitialization can ensue.

i. How Message Loss Repairs Are Made

UDP messages sent by a process Pj can either be lost on their way to S or on their way to other process Pk. Losses are repaired in different ways in these two cases.

As noted above, a process Pj determines that one or more descriptions it has sent out about an object A it owns have not been received by S if too much time elapses without these descriptions being reflected in an Object State Summary message from S. Specifically, one of two cases obtains.

One, the highest counter value for A in the objects table is C while Pj knows that A is in state D, D>C. Note this case includes the case that state D specifies that A has been removed. In that case, Pj sends a description of A to S that can be understood given state C. This is sent in an Object State message over the TCP connection from Pj to S to guarantee that it will be received.

Two, A is not in the objects table while Pj knows that A is in state D. Note this case could also conceivably include a situation where A was removed already. In that case, Pj sends a full description of A to S that can be understood given no prior information. Again, This is sent in an Object State message over the TCP connection from Pj to S to guarantee that it will be received.

Also as noted above, a process Pk determines that it has failed to receive one or more descriptions about an object A it does not own via Object State Summary messages. It if discovers in the summary that the object has been deleted, it can take care of this based solely on the information in the summary. Otherwise, Pk sends, via TCP, an Object State Summary message to S stating what Pk already knows. S replies via TCP with an Object State message containing appropriate differential messages. A single pair of messages suffices to update all lost information.

The Object State Summary message sent by Pk is syntactically identical to the ones sent by S. It is also semantically identical in the sense that it is accurately summarizing what Pk knows about objects it does not own. However, it is used in a different way, because it is not used to update the objects table in S. Rather, S sends a message to Pk, to update the world model copy in Pk. Note also that the SenderID in the Object State Summary Pk sends is Pk's spCom object and that there are never any new object entries and never any reference to an object Pk owns.

Suppose that the most recent state information known to S for an object A corresponds to counter E. Suppose further that S receives an Object State Summary message from Pk specifying that Pk knows only about state C of A (C<E). In that case, S sends a description of state E of A to Pk that can be understood relative to C. Pk can use the state C=0 to indicate that it knows nothing about A. This forces S to send a full description of S.

As messages travel between S and Pk, both S and Pk may be learning more about A from arriving UDP messages. That is all to the good. At any moment S and Pk respond based on the best information they have.

It is important to realize that while the above is the method of explicit message repair in ISTP, it is not the only method of repair and in many situations not even the most important method of repair. In particular, information about rapidly changing objects is often rendered obsolete by descriptions that can be understood without reference to lost messages. This allows many repairs to effectively be made without taking any extra action other than creating differential messages that can be understood based on several prior states.

j. How Processes Join A Communicating Group

A process Pj joins a communication group by opening a TCP connection to the server for the group if one does not already exist and sending an Object State message contain an spCom object that expresses the process's desire for a connection. Note that unlike other world model objects, spCom objects are never communicated by multicast, but rather only via TCP connections between processes and servers. spCom objects have the following fields that are shared between process:

. . . all the fields in any shared object including Shared-Bits: 16 bits—representing logical values.

Initialize: the next to low-order bit, bit 1—if 1, forces initialization.

Disconnect: bit 2—if 1, indicates that process is disconnecting.

ProcAddress: 32+16 bits—Internet address and port number for process.

MaxDelay: 32 bits—requested MaxDelay time in milliseconds modulo one week.

As described below, the Initialize bit requests that the server send all the information, see below, that is needed to initiate or reinitiate communication in the group.

As will be discussed, the disconnect bit indicates that the process is disconnecting.

The ProcAddress specifies the communication address for the server to use when sending information to the process. It serves to identify the TCP communication link to use.

The MaxDelay field can be used to request a particular MaxDelay value for a process. Alternatively, it can be set to zero, leaving the choice entirely up to the server. Note that in ISTP all processes are capable of being both clients and servers. A process discovers that it is being requested to be a server because it is sent an spCom object that it does not own. When this happens it can decide to refuse the request in which case no further action is necessary. Otherwise, it initiates a connection to the group as discussed below. Note that a process can also refuse or forward the initial request for a TCP connection.

To grant a request for communication in a group, the server first sends a LocaleEntry message to the process. Locale Entry message fields:

MessageTypeID: 16 bits—value 3 indicates this is a Locale Entry message.

SenderID: 32 bits—compressed GUID of spCom requesting connection.

SendTime: 32 bits—time message sent in milliseconds modulo one week.

Bits: 16 bits—representing logical values.

Initialize: the next to low-order bit, bit 1—if 1, forces initialization.

Disconnect: bit 2—if 1, forces disconnection.

NumberOfGUIDPrefixes: 16 bits—number of prefixes G in GUIDTable.

GUIDTable: G GUIDPrefix entries-96 bits each

GUIDTableEntryIndex: 16-bits—used in compressed GUIDs.

GUIDPrefix: 80-bits—prefix potentially shared by many GUIDs in message.

MulticastAddress: 32+16 bits—Internet address and port number.

MaxDelay: 32 bits—MaxDelay time in milliseconds modulo one week.

The MessageTypeID, SenderID, SendTime, NumberOfGUIDPrefixes, and GUIDTable are the same as in the other message types. The spCom object that initiated the request is used to identify the Locale Entry message granting the request.

The Initialize bit specifies that the process Pj should send or resend all the information, see below, that is needed to initiate or reinitiate communication in the group.

The disconnect bit indicates that the process should disconnect as fast as possible. If it does not do so, the server may forcibly evict the process.

The key field in this message is the MulticastAddress, which specifies the address to use when sending and receiving information about changes in objects.

The MaxDelay field specifies the MaxDelay value that Pj should use for messages communicated on the MulticastAddress.

The server picks the multicast address the group should use. If it detects interference from other traffic on this address, then it can pick a new address and send new Locale Entry messages specifying that the members of the group should change the address they are using.

This channel hopping approach can also be used to evict a rogue process from the group.

The server also picks the MaxDelay to use. A simple server can pick one fixed value for the entire group. Alternatively, the server can assess the needs of individual processes and pick per-process delays. In either case, it is important for the server to make these decisions so that there will be proper synchronization between the MaxDelay for a process and the corresponding Object State Summary message rate.

Immediately after the Locale Entry message, the server sends a Object State message containing a full description of each object being shared by the group. This potentially quite large message initializes the world model in Pj to the current state. Once this is done, Pj can proceed as if it had always been in the group.

Following the Object State Message, the server sends an Object State Summary message that appropriately initializes the objects table in Pj. This message is moderately large because all the objects are new in the table.

As soon as a Locale Entry message is received, a process can begin sending out information about the objects it owns and listening for information about other objects. However, it cannot understand incoming differential messages until it has gotten the current state downloaded from the server.

If the Locale Entry message has the initialize bit on, then Pj must send out full messages about every object it owns on the specified address.

Several things are worthy of particular note about the group connection method above. First, the joining is as fast as practically possible. In particular, the download happens by the fastest possible reliable means. The complete time to join also includes connecting to the specified multicast address, depending how the relevant routers work, this can take a fair amount of time, but this is out of the control of ISTP.

Second, the initial download of information must contain descriptions of all the objects removed less than MaxDelay seconds in the past, so that delayed messages about these objects will not cause them to erroneously appear in Pj.

k. How Processes Leave A Communicating Group

To leave a communication group, a process Pj must first cease changing any objects it owns and therefore cease sending messages to the group address. It must then wait to see that the server S has obtained information about the final state of these objects, sending this information to S by TCP if necessary. Once S has the requisite information, Pj should send an Object State message to S containing the appropriate spCom object with the disconnect bit on and then can simply break its connection to S.

Typically, it is expected that Pj will remove all its objects or transfer there ownership to other processes before leaving the group. If objects are left with no running owner, ISTP does not specify what should happen to them. The server could choose to maintain the existence of the objects, or to remove them.

If a process Pj crashes or otherwise becomes disconnected from S, this can be detected relatively quickly by the server S, because the server will no longer be able to send Object State Summaries to Pj. Again ISTP does not specify exactly what should happen in this situation. As above, the server could choose to maintain the existence of Pj's objects in the hope that Pj will soon reconnect to S, or to remove them.

l. Reliability Control In order to provide detailed application level control of the level of reliability vs speed in ISTP, every shared object is given the following two additional shared control bits.

All shared objects have the following fields that are shared between process:

```
    . . .
    SharedBits: 16 bits - representing logical values.
    . . .
    ForceReliable: the next low-order bit, bit 1 - if 1, forces
changes to be communicated by TCP via the server.
    InhibitReliability: bit 2 - if 1, inhibits the server from
ensuring that changes are reliably communicated.
```

If the ForceReliable bit, which by default is not set, is set in an object when a change is going to be communicated, then the change is communicated by TCP to the server, which in turn uses TCP to communicate the change to the other processes in the group. This is the same kind of communication that is used when multicast has to be simulated, see below. Note that the ForceReliable bit must be shared, because the server needs to know when it is on. This is slower than using multicast to communicate the information and requires greater bandwidth, but minimizes the time until every process in the group will know that the change has occurred. Several non-obvious aspects of this communication are important:

First, in general it is intended that this feature will be used sparingly. In some sense the whole purpose of ISTP is to make this kind of communication unnecessary.

Second, beacons which are the subject of U.S. patent application Ser. No. 08/556,227 filed Nov. 9, 1995 by Richard C. Waters and incorporated herein by reference are always communicated in this style via beacon servers. In many situations, beacons provide a more selective way to get highly reliable communication between processes.

Third, whenever TCP is used to communicate object changes by a client or the server all the objects that need to be communicated are communicated together at the same time by placing them in a single Object State message. This guarantees that all the changes will be received at the same time. As a result, the ForceReliable bit can be used for synchronization.

If several objects are changed together, and the ForceReliable bit is set on in each object, then all the changes will be communicated together and every other process will see the changes as a group, rather than piecemeal. Note that if UDP were being used, it would be difficult to guarantee this, because some changes could be received before others and a message with some of the changes in it could get lost.

Fourth, when TCP is forced by the ForceReliable bit, differential messages are used in the interest of minimizing bandwidth. However, in order to guarantee that the messages can always be decoded by the receiver, they have to be differential with respect to the last ForceReliable message if any, not just the last message. The reason for this is that if the last message was not reliable, then some receiver may not have gotten the last message.

As a result, if the ForceReliable bit is set on after having been off for a while, it is very likely that a full object message will have to be sent. This can make the cost of setting the ForceReliable bit quite high. Objects have to have an associated field that specifies what the most recent reliably sent counter value was, or the system core must just use a full message whenever the prior message was not sent reliably.

Fifth, when the ForceReliable bit is set on, it stays on rather than automatically being turned off. If you want it turned off again, you have to do that explicitly.

If the InhibitReliable bit, which by default is not set, is set in an object, then information about changes in the object are communicated by multicast, and the system minimizes the effort spent to ensure that the message will be received. In particular, when the server finds out about a change that has the InhibitReliable bit set, it does not include the new counter value in Object State Summary messages. Note that the InhibitReliable bit must be shared, because the server needs to know when it is on. This means that while processes will get multicast change messages, processes that happen to miss messages about changes with the InhibitReliable bit on will never know that they have missed anything and therefore will not expend resources trying to get this information. Several non-obvious aspects of this communication are important:

First, in general it is intended that this feature will be used sparingly. In some sense the key purpose of ISTP is to make reliable communication so cheap that there is no need to have unreliable communication. Nevertheless, setting the InhibitReliable bit is appropriate when sending something like very rapid position updates, where the information is so rapidly out of date that there is no point in making it reliable.

Second, there is complexity here in that if the server gets several changes only the last of which has InhibitReliable set, then it must include the counter for the next to last change in its next Object State Summary message. It can achieve this by not updating its objects table when it receives changes with InhibitReliable set.

Third, another complexity here is that when using InhibitReliable one certainly also wants to use differential messages. However, these messages should reliably be differential all the way back to the last reliable message so that they can always be decoded. Alternatively, processes have to be able to ask for updates from the server when they are getting differential messages they cannot decode even when they are not getting Object State Summary messages that say that changes are occurring. The latter is certainly permitted by ISTP, but it would be easy to make a mistake and fail to support it.

Fourth, even if InhibitReliable is set all the time for an object, some changes nevertheless have to be sent reliably. In particular, the initial creation of an object and its eventual removal are always communicated reliably. If these changes were not reliably sent, then processes could get completely mixed up.

Fifth, when the InhibitReliable bit is set on, it stays on rather than automatically being turned off. If you want it turned off again, you have to do that explicitly.

Sixth, merely not changing the counter value would have a similar effect to the InhibitReliable bit, but would neither allow differential messages to work right nor allow processes to treat descriptions with duplicate counter values as coming from duplicate messages.

If the ForceReliable and InhibitReliable bits are both set in an object then changes are sent both by TCP and multicast UDP. This is costly of bandwidth, but guarantees minimum latency of communication and full reliability in minimum time.

m. Ownership Transfer

From the perspective of ISTP, a relatively small detail is that the ownership of objects can change. This is done by having the current owning process Pj send out a message in which the owner field has been changed to some other process Pk. However, several things need to be kept in mind.

First, after changing ownership, Pj cannot send out any other messages about the object, except that Pj must remember the state of the object in which the ownership changed as long as necessary to ensure that the server S finds out about the change or later states.

Once that has happened, all responsibility of Pj for the object ceases. While this is going on, and after, Pk can send out messages about the object.

Second, in the discussion above whenever it talks about a process Pj owning an object, what this means is when a process Pj 'thinks' it owns an object. That is to say, when the world model in a process specifies that the process owns the object. This is distinct from some global concept of ownership.

Note that when a process Pj gives up ownership to Pk, Pj knows it is no longer the owner before Pk or any other process can find out that Pk is the owner. Therefore, there are brief periods when no process thinks that it is the owner of a given object. However, it can never happen that two processes think they are the owner of an object.

Note that if out-of-order messages later than MaxDelay were processed, then multiple simultaneous owners is one of the weird things that could result.

n. Simulated Multicast

For simplicity, the above assumed that all the processes in a group can be in multicast communication with each other. However, given the current state of the Internet, this may not be possible for many reasons including the fact that many routers are not multicast capable and many firewalls will not allow multicast traffic to pass through. Therefore, ISTP includes the capability to do communication via simulated multicast using TCP rather than actual UDP multicast.

In the simulated multicast mode, a process Pj does all of its communication with the server S rather than directly with other processes Pk. In particular, all the Object State messages it would have sent by UDP multicast, it instead sends directly to the server over the TCP connection. Similarly, all the messages Pj would have received by multicast it receives over the TCP connection instead. To facilitate this, everything is arranged in ISTP so that messages can be correctly interpreted no matter what communication channel they arrive on.

In simulated multicast mode, ISTP essentially operates in a central server mode and has no communication speed advantage over other central server designs. This mode is included in ISTP purely to allow graceful degradation when a given process is not capable of multicast communication with other processes in the group.

Note that given a group of processes, the situation involving multicast capabilities might be very complex featuring: multiple disconnected subgroups that are multicast capable within subgroups, processes that can send multicast but not receive it, and vice versa, and dynamic changes where processes are capable of multicast communication at some moments but not others. ISTP does not attempt to optimally use multicast in all this situations, rather it attempts to work well in a few common situations while working correctly in all situations.

In particular, the communication group is divided into two parts: one part which must include the server is the part where every process can multicast send and receive to and from every other, and the remainder where TCP is used for all communication. Therefore, each process Pj is tagged as either using multicast communication or not. Automatic switching from multicast capable to not is supported, but there is no automatic support for the reverse.

The following discusses in detail exactly how multicast is simulated, how the use of simulated multicast is triggered, and how a process could resume multicast operation after having switched to simulated multicast.

Locale Entry objects have an additional bit field not discussed above.

---

Locale Entry message fields:
...
Bits: 16 bits - representing logical values.
...
UseTCP: bit 3 - if 1, forces all communication via TCP.
...

---

If a process Pj receives a Locale Entry message with the UseTCP bit on, it stops sending its relevant output via multicast and instead sends all of it directly to the server via TCP. If the UseTCP bit is on, then the value of the MulticastAddress field is irrelevant. Pj does not try to open a connection to the address and neither sends or receives on it. If a multicast connection was open, Pj closes it.

Note that a Locale Entry message with UseTCP on might arrive to initiate communication, or on the middle of communication. If Pj subsequently receives a Locale Entry message with UseTCP off, then Pj will attempt to resume the use of multicast.

If the server S has told a process Pj not to use multicast, then S forwards all the information originating from other process Pk to Pj via TCP and takes the information from Pj and multicasts it to the processes in the group that are multicast capable.

The decision of whether a process Pj uses multicast is a joint one between Pj and the server S. It can be done unilaterally by either party by direct request. Specifically, S can tell Pj not to use multicast as described above. Similarly, Pj can request that multicast not be used. For this purpose there is an additional bit in spCom objects not described above.

spCom objects have the following fields that are shared between process:

---

...
SharedBits: 16 bits - representing logical values.
...
UseTCP: bit 3 - if 1, forces all communication via TCP.
...

---

If the server receives an spCom object with the UseTCP bit on, then it should take this as a very strong request to reply with a Locale Entry message that also has the UseTCP bit on. A process Pj should turn this bit on initially if it has good reason to know that it is not multicast capable. Otherwise, as discussed below, there will be a period of low quality communication before ISTP automatically switches Pj to TCP mode.

Note that such an spCom could be sent to initiate communication or in the middle of communication to trigger a change. It is possible for an spCom requesting TCP to be followed later by one that requests that multicast communication be resumed. Using the bits above, either Pj or S can specify the use of TCP from the moment that Pj joins the group. However, it is expected that one might often want to be more optimistic, initially trying multicast and only switching to TCP if the multicast fails. To do this, Pj and S start out with multicast and observe the error rate in communication.

If Pj observes, based on Object State Summary messages from S, that a low percentage of its multicast output is getting to S, then Pj should send a new spCom requesting a switch to TCP.

If S observes, based on requests from Pj for object updates, that a low percentage of the data sent to it from other processes is reaching Pj, then S should send a new Locale Entry message switching Pj into TCP mode. For optimum performance, S should individually monitor how communication is going between each pair of processes in the group, but this is probably not necessary in most situations.

Using the above, it is easy to dynamically switch from multicast to TCP mode. However, once a process Pj is in TCP mode, there are no more attempts at multicast communication with Pj and therefore no basis on which to decide that one could switch successfully back to multicast mode. However, there are various approaches that could be used to make such a decision.

First, the server could occasionally switch Pj back into multicast mode and see if it worked. The price for this would be periods of reduced communication effectiveness. Therefore, if S takes this approach, it should reduce the frequency of its attempts if it meets with consistent failure.

Second, one could have Pj keep its multicast port open during TCP operation and create some experimental traffic specifically to assess whether multicast communication starts working. This is more complex, but allows the multicast connection to be assessed without forcing the application to suffer periods of poor communication.

Using one of the above approaches might be a good idea if multicast was working and unexpectedly stopped working. However, they are probably not worth the trouble if multicast never worked.

o. Locales

For simplicity, the discussion above has assumed that each process Pj participates in only a single communication group. However, the size of this group is limited by the number of processes a server can serve. This is a fundamental limit on scalability. A key aspect of ISTP is that it achieves scalability by breaking a virtual world into many chunks called 'locales' as discussed in U.S. patent application Ser. No. 08/520,099 by Barrus J. W. and Waters R. C., A System For Designing a Virtual Environment Utilizing Locales, filed Aug. 28, 1995 and incorporated herein by reference. Each locale is associated with a separate multicast communication group and a given process is expected to belong to several of these groups.

The key aspect of locales is that everything described above operates per-locale, rather than just once. For example, a given process does not just have one connection to one server, but rather several connections to several servers.

Similarly, a process does not have just one spCom, but several. Each object in the world model is identified by an explicit field as being 'in' at most one locale. All communication regarding an object occurs in the communication group associated with the locale the object is in. The information, including the multicast address, governing a communication group is cached in the associated locale object.

spCom objects are in locales just like any other. They trigger communication in the communication group associated with this locale.

Each locale is associated with a server. A given server may serve several locales. Locale objects specify, among other things, what server process serves the locale.

In general, having multiple simultaneous locale communication groups does not present any fundamental complications. However, there is one key thing that must be addressed—what happens when an object moves from one locale to another.

First, whenever an object changes locales, a full message describing the object has to be sent in the new locale and a possibly differential message has to be sent in the old locale specifying that the object has left the locale.

Second, just as the removal of an object has to be remembered for MaxDelay time, the leaving of an object from a locale has to be remembered for MaxDelay time, so that out-of-order messages will not erroneously cause an object to reappear in the locale.

Third, just as the initial download of information about objects in a locale must include information about recently removed objects, it must contain information about objects that have recently left the locale.

Fourth, a suggested MaxDelay interval can be specified as part of a locale object.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and contemplated as falling within the scope of the invention as limited only by the appended claims and equivalents thereto.

What is claimed is:

1. A system for fast, efficient and reliable communication of object state information among a group of users, comprising:

a network and a number of users at nodes of said network, each of said users having a computer coupled to said network;

a world model, containing objects stored at each of said users and coupled to respective computers;

means at a user for altering said world model thereat by altering objects of said world model such that objects of said world model are changed;

means including messages for communicating the current state of objects that have changed to other users over a lossy direct link to said other users for rapidly communicating the current state of said objects to said other users;

means at a user for detecting when messages describing object state are lost; and, a server coupled to said lossy direct link for storing said object states and for transmitting up-to-date object states over a lossless link to a user when requested by that user, whereby information transmitted over said lossy link which is lost can be recovered with information from said server.

2. The system of claim 1 wherein said server includes means for sending object state summary messages to said users over said lossless link and wherein said means for detecting when messages describing object state are lost includes means for comparing said summary messages with object states currently at the user such that retransmission of information is done on the basis of obtaining the most up-to-date information about objects rather than retransmitting every lost message.

3. The system of claim 2 wherein said summary message specifies for each object a counter value identifying the latest version of the state known to said server.

4. The system of claim 2 wherein said summary messages are differential messages specifying the state only of objects that have changed since the last summary message.

5. The system of claim 1 wherein said object state messages are differential messages indicating only the part of the state that is different from the prior state.

6. The system of claim 1 wherein said object state messages are differential messages indicating only the part of the state that is different from any of the previous N states, where N is greater than one, thereby allowing a differential message to be interpreted even if the prior message was lost so that it is not necessary to retransmit every lost message.

7. The system of claim 6 wherein said server includes means for transmitting a summary of changes in said object state to said users and further including means at each user for comparing a summary from said server to a like summary stored at said user as a result of said lossy direct link, thus to detect a lost message and for causing said server to transmit an updated message responsive to the detection of said lost message.

8. The system of claim 6 wherein said objects are identified by GUIDs, and wherein the assignment of GUIDs to objects includes means for causing the GUIDs for all the objects modified by a given user to have many bits in common, thereby allowing messages describing object state to be represented more completed.

9. The systems of claim 6 wherein a means for creating said differential messages describing object state includes bitmasks for representing which components of an object have change in the transmissions between each of said N previous states, thereby allowing the rapid and compact determination of what information needs to be included in said differential messages describing object state by combining said bitmasks with a logical OR operation.

10. The system of claim 1 wherein said objects are graphical objects.

11. The system of claim 1 and further including means at a user for rejecting messages describing object states that arrive out of order with a delay greater than a predetermined amount of time, thereby placing a bound on how long said user must maintain a record that an object has been removed, so as to be able to reject out of order messages about said objects.

12. The system of claim 1 wherein said group of users can be dynamically changed, and wherein said server includes means for downloading the current state of every object in the world model to a user when requested by said user.

13. The system of claim 1 wherein said lossy direct communication link utilizes multicast.

14. The system of claim 1 wherein said server includes means for simulating multicast communication to those of said users who are incapable of direct multicast communication.

15. A system for fast, efficient and reliable communication of object state information among a group of users, comprising:

a network and a number of users at nodes of the network;

a world model, containing objects stored at each of said users and coupled to respective computers;

means at a user for altering said world model thereat by altering objects of said world model such that objects of said world model are changed;

means including messages for communicating a current state of said objects that have changed to other users over a lossy direct link to said other users for rapidly communicating the current state of said objects to said other users;

means at a user for detecting when messages describing object states are lost;

a server coupled to said lossy direct link for storing said object states and for transmitting up-to-date object states over a lossless link to a user when requested by that user, whereby information transmitted over said lossy link which is lost can be recovered with information from said server, and means for rejecting messages that arrive late by a predetermined amount, thus to create lost messages, said server providing recovery of the information lost thereby, whereby the amount of information that must be stored by each user is bounded.

* * * * *